(12) United States Patent
Egan, III et al.

(10) Patent No.: US 6,348,130 B1
(45) Date of Patent: Feb. 19, 2002

(54) VARIABLE PRESSURE SCREENING

(75) Inventors: John J. Egan, III, Centerville, OH (US); David E. Suica, Carmel, IN (US)

(73) Assignee: Thermo Black Clawson Inc., Middletown, OH (US)

( * ) Notice: Subject to any disclaimer, the term of this patent is extended or adjusted under 35 U.S.C. 154(b) by 0 days.

(21) Appl. No.: 09/623,826

(22) PCT Filed: Mar. 11, 1999

(86) PCT No.: PCT/US99/04660

§ 371 Date: Sep. 8, 2000

§ 102(e) Date: Sep. 8, 2000

(87) PCT Pub. No.: WO99/46026

PCT Pub. Date: Sep. 16, 1999

Related U.S. Application Data

(60) Provisional application No. 60/077,533, filed on Mar. 11, 1998.

(51) Int. Cl.[7] .............................. D21C 9/00; B07B 1/18
(52) U.S. Cl. ........................ 162/55; 162/251; 209/233; 209/243; 209/273
(58) Field of Search ............................ 162/55, 57, 251; 210/748, 304, 415; 209/273, 306, 233, 240, 243, 284

(56) References Cited

U.S. PATENT DOCUMENTS

| 896,473 | A | * | 8/1908 | Shortt |
| 1,159,387 | A | * | 11/1915 | Inman |
| 3,154,255 | A | * | 10/1964 | Schulman et al. |
| 4,166,028 | A | | 8/1979 | Weber |
| 4,264,437 | A | | 4/1981 | Hayes, Jr. |
| 4,267,035 | A | | 5/1981 | Martin |
| 4,919,797 | A | | 4/1990 | Chupka et al. |
| 5,078,275 | A | | 1/1992 | Chupka et al. |
| 5,176,261 | A | * | 1/1993 | Holz ........................... 209/273 |
| 5,385,240 | A | | 1/1995 | Egan, III et al. |
| 5,566,833 | A | * | 10/1996 | Pfeffer et al. ................ 209/273 |
| 5,601,192 | A | * | 2/1997 | Hutzler et al. ............... 209/273 |
| 6,029,825 | A | * | 2/2000 | Pfeffer et al. ................ 210/414 |
| 6,165,370 | A | * | 12/2000 | Heissenberger ............. 210/741 |

* cited by examiner

*Primary Examiner*—Peter Chin
*Assistant Examiner*—Carlos Lopez
(74) *Attorney, Agent, or Firm*—Biebel & French

(57) ABSTRACT

Pressure type screening apparatus for screening papermakers' stock and method of use is disclosed. Screen (20) has an inlet screening surface (23) and an outlet surface (unlabled). Pressure transducers (not shown) vary the fluid pressure on the inlet surface of the screen (23) from a maximum to a minimum, and also vary the fluid pressure on the outlet surface of the screen (20) from a minimum to a maximum at a repetitive cyclic rate. The amplitude of such pressures is such that flow reversal occurs through the screen (20) and any fiber mat that tends to form on the inlet surface (23) is disrupted or fluidized.

9 Claims, 3 Drawing Sheets

VARIABLE PRESSURE SCREENING

This application is a 371 PCT/US99/04660 filed Mar. 4, 1990, which claims benefit of 60/077,533 filed Mar. 11, 1998.

BACKGROUND OF THE INVENTION

Slurries of papermakers' pulp are conventionally screened in pressure screening apparatus in which moving foil members rotate in closely spaced relation to a screen inlet surface, and apply to such surface positive and negative pressure pulses that tend to keep the screen openings or slots clear and free from blocking by fiber mat build up on the screen surface. Two or more foils are commonly rotated at surface speeds as high as 5,000 feet per minute. Such conventional screening apparatus has been highly successful and is in widespread use in pressure screens, and examples may be seen in any one of the following U.S. Patents and the references cited in such patents: U.S. Pat. Nos. 5,385,240, 4,919,797, 5,078,275, 4,267,035 and 4,166,028.

Such rotating foil screening apparatus requires substantial energy to rotate the foils. However, such screens are inherently subject to failure due to the complexity of the construction, and the necessity to maintain a rotary structure and mechanism to drive the rotary structure at the desired speed and power input rate. There is accordingly a need in the industry to provide a screen that utilizes existing screening elements and concepts, such as the flat or the cylindrical basket type screen, and in which the rotary elements are reduced or eliminated altogether and by which the reliability is increased, and capital expenditure and energy demands are substantially decreased.

SUMMARY OF THE INVENTION

This invention provides a screen and methods for screening papermakers' pulp that fluidize the fiber mat forming on the inlet side of the screen surface with comparatively low energy requirements. In one embodiment this is accomplished by periodically varying the pressure on the inlet side of the screen at a given frequency and simultaneously varying the pressure at the outlet side of the screen, with a pressure waveform in an out-of-phase condition with a pressure waveform on the inlet side of the screen, such that the differential pressure across the screen periodically reverses in polarity. Accordingly the fiber mat tending to form at the screening element inlet surface is disrupted by the periodic or momentary reverse flow conditions that occur during the pressure reversals.

The mechanism by which the flow reversals are created, and the rate or frequency thereof, may be varied depending upon the requirements for the particular equipment, the rate of mat formation, the consistency of the slack slurry, etc. Flow reversal through the screen openings or slots may be caused through a mass momentary flow reversal of the content of the screen, but need only be localized at the screen slots or openings. The use of phased sonic or ultrasonic transducers positioned to direct a waveform output simultaneously to the inlet and outlet surfaces, or the inlet surfaces alone, to disrupt the mat formation is considered to be within the scope of this invention.

In an embodiment illustrated in the drawings, sychronized pulsating tranducers or generators in the form of pumps, one pump at the inlet feed and pump at the accepts outlet, are controlled to effect periodic flow reversals at the screen. Also, an oscillating piston type of pump or equivalent could be connected with one end at the inlet and another end at the outlet and driven at a desired rate to effect the desired inverted pressure waveforms at the inlet and outlet surfaces of a screen.

In a broad sense, the method is independent of the particular waveforms of the pressure at the inlet screen and the pressure at the outlet screen, i.e., such pressure waveforms need not be sinusoidal as long as periodic momentary flow reversals or pressure waves disrupt the formation of a fiber mat on or at the screen inlet surface. In a cylinder type screen, either the inner surface or the outer surface may be the inlet surface, depending upon the flow arrangement of the pressure screen.

In the broadest sense, these concepts and methods are independent of screen geometry such as the shape or nature of the screening components themselves or that of the feed or accepts chambers. They are also independent of the specific means by which the synchronized and opposite pressure changes are created or applied across the screen.

It is accordingly an important object of the invention to provide simplified variable pressure screening apparatus and method in which flow reversals are induced across a screen by oppositely and cyclically varying the fluid pressure at (or associated with or integrated into) a screen inlet and screen outlet.

A further object of the invention is the use of pulsating pumps or pressure transducers that are synchronized to cause periodic flow reversals across a screen element in a pressure screen or papermakers' pulp.

Other objects and advantages of the invention will be apparent from the following description, the accompanying drawings and the appended claims.

DETAILED DESCRIPTION OF PREFERRED EMBODIMENTS

Figure 1:
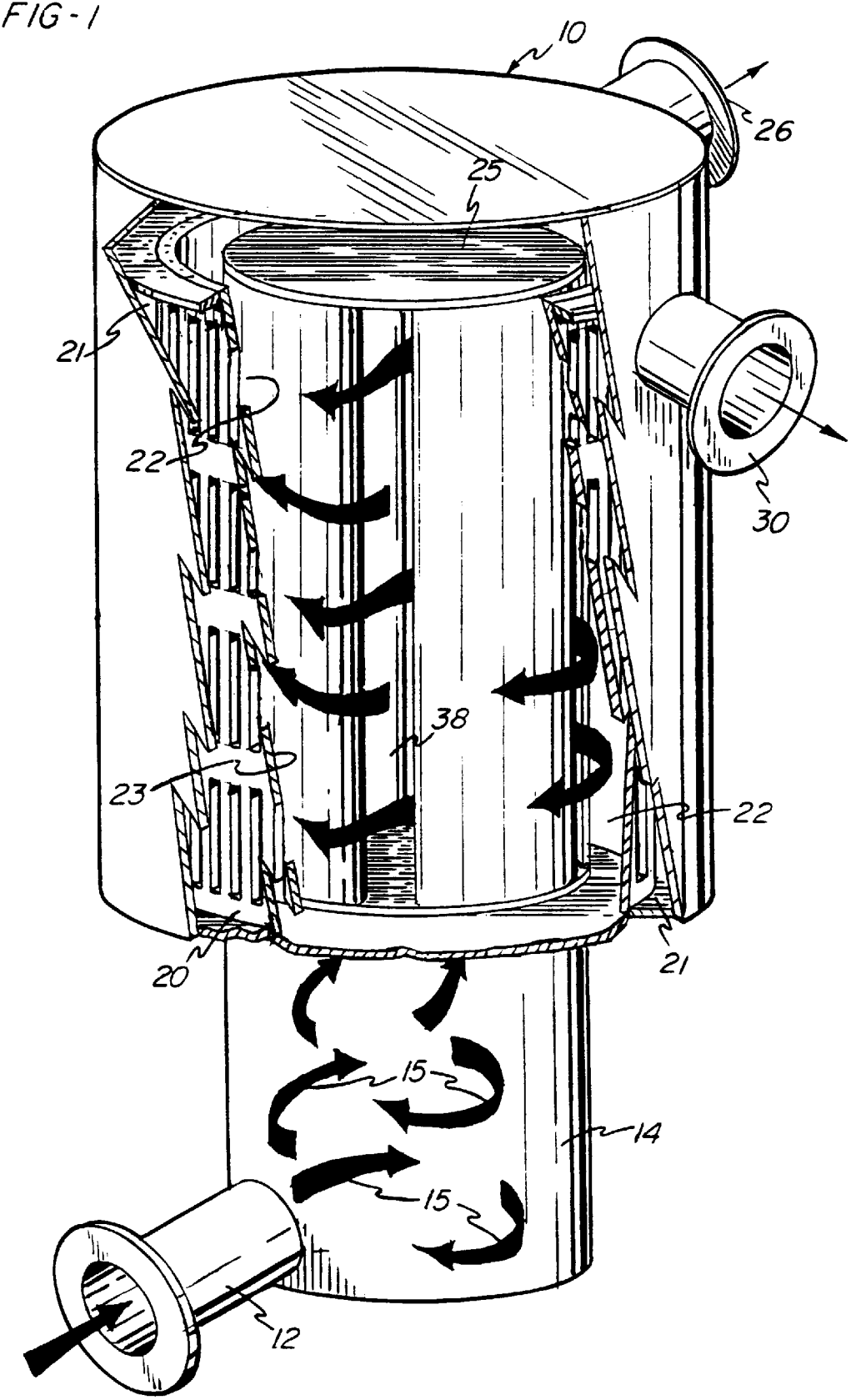
FIG. 1 is a broken away perspective view of a screen according to this invention.

Referring to the figures of the drawing which illustrate a preferred embodiment of the invention, the broken away view of a pressure screen for papermakers' stock constructed according to this invention is illustrated at 10 in FIG. 1. In the screen, the customary rotary structure has been eliminated. An inlet 12 brings a suspension of pulp in water to be screened into an inlet chamber 14 in a tangential arrangement and creates a vertical flow 15 within the chamber. The inlet flow turns upward into a screening chamber which is shown partially broken away as including a cylindrical screen 20, an annular accepts chamber 21 at the outer surface of the screen, and an annular inlet chamber 22 in communication with the inlet chamber 14 from below and at which the stock suspension is applied to the inlet surface 23 of the screen 20.

A rejects chamber 25 is formed at the axial upper end of the screen 20 and leads to a rejects outlet 26. An accepts outlet 30 removes material from the accepts chamber 21.

Figure 2:
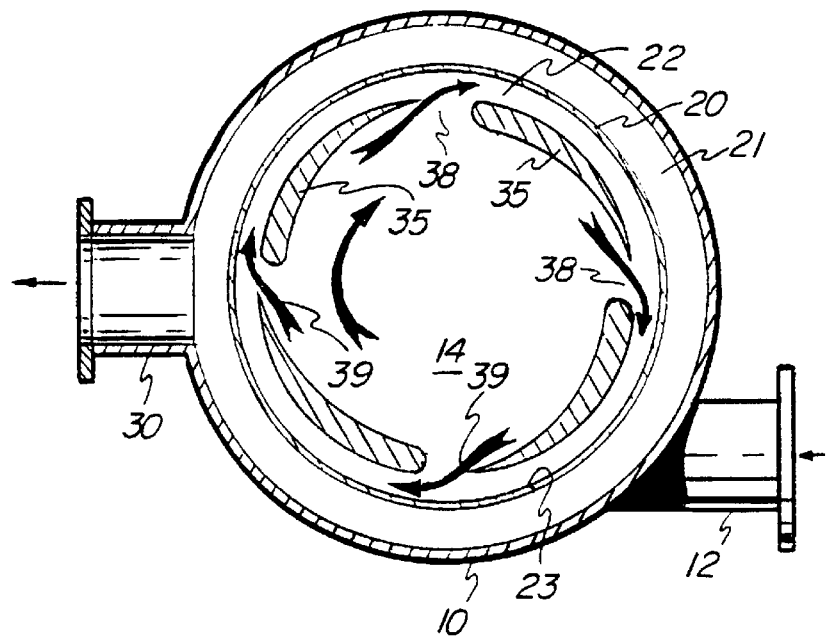
FIG. 2 is a sectional view through the screen housing and the accepts outlet showing the direction of flow of the pulp suspension.

The interior of the housing of the screen 10 in certain aspects can be appreciated better by reference to the sectional view of FIG. 2. A plurality of individual non-rotating foils 35 are formed in offset or spaced relation to the inlet surface 23 of the screen 20, defining the inlet chamber 22 and separating that chamber from the bottom inlet chamber 14. The non-rotating foils 35 define a plurality of circumferentially spaced slots 38 formed in the arcuate spaces between the nose of one foil and the tail of the next foil, and in effect define flow channels to direct the inlet stock slurry into the inlet chamber 22. The flow is illustrated by the arrows 39. While a preferred flow arrangement distribution is illustrated, any suitable arrangement may be used which efficiently and effectively distributes the feed stock into a screening chamber 22.

Figure 3:
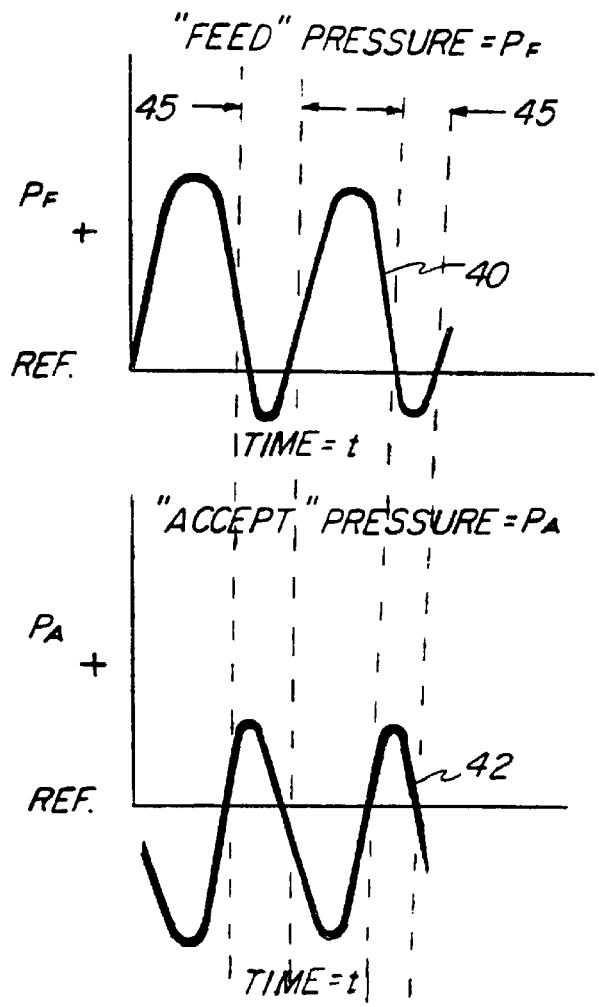
FIG. 3 is a diagram of the waveforms of the pressure at the feed side and at the accepts side of a screen in the apparatus of FIGS. 1 and 2.

The method operation of the invention can be seen from the pressure diagrams of FIG. 3 drawn to a common ordinate, though the horizontal ordinate may be shifted vertically with respect to each other representing pressure ($P_A$ and $P_F$), and with abscissas representing time (t). The crossing points on each abscissa are at a common reference pressure which may be zero or may be a positive pressure with reference to the ambient pressure outside of the enclosed pressure screen 10.

The upper waveform 40 represents feed pressure and the lower inverted waveform 42 represents the simultaneous condition of accepts pressure. Feed pressure $P_F$ may be the instantaneous pressure on the inlet side screen element surface and accepts pressure $P_A$ may be the instantaneous pressure on the accepts side screen element surface. During each cycle, there are reverses of the pressure in the feed chamber and in the accepts chamber which cross either above or below the reference line, and do so at approximately the same time since the pressure waveforms are relatively synchronized.

The pressure waveforms 40 and 42 are timed in such a manner that the inlet or feed waveform $P_F$ is at a maximum when the outlet waveform is at a minimum, thereby enhancing flow through the screen. They are also timed such that when the inlet or feed waveform 40 is at a minimum the outlet or accepts waveform 42 is at a maximum to affect a reversal of flow in the time interval represented by the bracket arrows 45 in FIG. 3. During this time, the screen becomes cleared by the disruption of the mat of paper pulp fibers forming on the inlet surface 23 and the reversal of flow in the screen openings or slots, as the case may be. During such reversals, a pulp mat which has been loosened during the reversal portion of each pressure cycle is fluidized and therefore removed from close proximity to the screen inlet surface. The rejects which do not pass through the screen pass into the rejects collection region 25 above the screen and out the rejects outlet 22.

Figure 4:
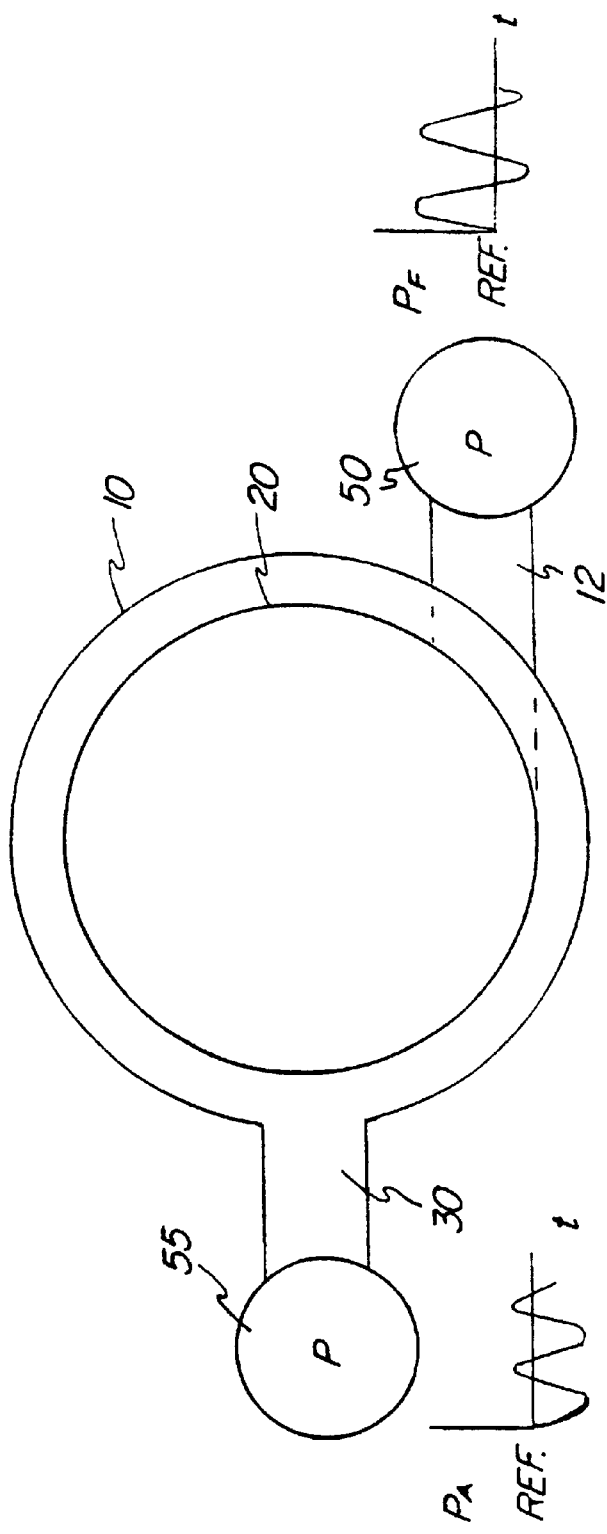
FIG. 4 is a diagrammatic representation of a pumping arrangement and the waveforms created by the respective pumps.

FIG. 4 diagrammatically shows a feed through arrangement in which a pulsating feed pump 50 feeds the stock suspension into the inlet 12 and a synchronized pulsating accepts pump 55 receives the stock material from the outlet 30. The respective pressure waveforms created in the stock suspension and in the interior of the screen 10 are illustrated by the waveform diagrams adjacent the respective pumps.

The impulse or variable pressure pumps as illustrated in FIG. 4 are intended to be representative of manners by which a pressure component having a waveform and a second pressure component having an inverted waveform may be applied to the respective inlet and outlet surfaces of a screen for screening a paperstock suspension. Such pressures may alternatively be mechanically induced within the interior of the pressure screen or may be applied mechanically by transducers such as submerged sonic or ultrasonic transducers with horns or radiators positioned adjacent the respective surfaces and operated in a synchronized manner to produce a first waveform at one surface and a substantially inverted waveform at the other surface.

In any commercial embodiment of apparatus designed to operate according to the principles of this invention, it is expected that a housing would be used in which the housing walls cooperate to redefine the wave impulses and concentrate the energy at the screen surfaces. The removal of the conventional structure for rotationally supporting either a drum type disrupter or an arm type disrupter, and the removal of the foil disrupter structure itself, permits a wide latitude in optimization of the housing structure for the purpose of maximizing the benefit of the pulse waveforms as described in this application.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. The method of operating pressure type screening apparatus for screening particles from a liquid including a screen member having an inlet screening surface and an outlet surface, comprising the steps of continuously varying the fluid pressure on the inlet surface of said screen member from a maximum to a minimum and simultaneously varying the fluid pressure on the outlet surface of said screen member from a minimum to a maximum at a repetitive cycle rate and amplitude such that a flow reversal occurs through the screen member nominally one time for each such cycle, said foregoing steps being accomplished by pressure pulses generated only by the fluid entering the inlet of said pressure screen and only by pressure pulses generated at the outlet of said pressure screen wherein the pressure pulses are sufficient to create a flow reversal at the surface of the screen.

2. The method of preventing the formation of a fiber mat on an inlet surface of a screen member in pressure screening apparatus for screening papermakers' stock in which the screen member has an inlet surface and an outlet surface, comprising the steps of applying a pulsating pressure to the stock in said pressure screen causing a pulsating pressure at said screen member outlet surface, such pulsating pressures being applied out-of-phase with each other such that discreet intervals of pressure reversals are caused across the screen member between the inlet and outlet surfaces during which any fiber mat that tends to form on the inlet surface is disrupted or fluidized, said foregoing steps being accomplished by pressure pulses generated only by fluid entering an inlet of said pressure screen and only by pressure pulses generated at an outlet of said pressure screen wherein the pressure pulses are sufficient to create a flow reversal at the surface of the screen.

3. The method of claim 2 in which said pulsating pressures are applied such that the pressure reversals last for a shorter period of time than the times in which the pressure across the screen member is not reversed.

4. A method of claim 2 in which said pressure screening apparatus has an inlet for feeding papermakers' stock into the interior of said pressure screening apparatus and has an accepts outlet in which screened stock passes from the interior of said pressure screening apparatus, in which said pulsating pressures are applied respectively at said inlet and said outlet.

5. The method of claim 2 in which said pulsating pressures are approximately 180° out of phase with each other.

6. a method of operating a pressure-type screening apparutus for screening a suspension of paper fibers in liquid including a screen member in said apparatus defining therein an inlet chamber on one side of said screen member and an accepts chamber on an oppiste side of said screen member, comprising the steps of continuously and cyclically varying the pressure in said inlet chamber from a maximum to minimum and simultaneously continuously varying the pressure in said accepts chamber from a minimum to a maximum at a common repetitve cyclic rate, in which the amplitude of said continuously varying pressures, at least during a portion of each cycle, causes a pressure reversal across said screen member for disrupting any mat of paper fibers that has formed on the screen inlet surface, thereby maintaining the fibers in a fluidized condition in said inlet chamber, said foregoing steps being accomplished by pressure pulses generated only by fluid entering an inlet of said pressure screen and only by pressure pulses generated at an outlet of said pressure screen wherin the pressure pulses are suffient to create a flow reversal at the surface of the screen.

7. Pressure screening apparatus for screening a suspension of papermakers' fibers in a liquid comprising a housing having an inlet for applying said suspension to a screen in said housing for said suspension at a positive pressure, said screening apparatus further having an outlet through which stock suspension passing through said screen is removed from said housing, a cyclical pressure impulse generator connected to apply a continuously varying pressure through said housing inlet, and a further cyclical pressure impulse generator connected to apply a continuously varying pressure through said outlet, said generators at least a portion of the time providing an out-of-phase pressure impulse across said screen sufficient to cause periodic pressure reversals across said screen.

8. The apparatus of claim 7 in which said pressure generators provide substantially sinusoidal pressure waves at substantially the same frequency but substantially out-of-phase with each other.

9. Pressure screen apparatus for screening a suspension of papermakers' fibers in a liquid comprising a housing having an inlet for applying said suspension to an inlet surface of a screen in said housing at a positive pressure, said screening apparatus further having an outlet for removing said suspension from said housing through an outlet surface of said screen, a plurality of individual non-rotating foils in an offset relation to the inlet surface of the screen said non-rotating foils defining a plurality of flow channels to direct said suspension to said inlet surface of said screen, said apparatus further comprising a first means for creating pressure pulses and a second means for creating pressure pulses said first and second means associated to create flow reversal of said suspension at the inlet and outlet surface of the screen.

* * * * *